United States Patent
Smout

(10) Patent No.: US 8,823,332 B2
(45) Date of Patent: Sep. 2, 2014

(54) FAULT TOLERANT ELECTRIC DRIVE SYSTEM

(71) Applicant: Rolls-Royce Engine Control Systems Ltd., Derby (GB)

(72) Inventor: Peter Douglas Smout, Solihull (GB)

(73) Assignee: Rolls-Royce Controls and Data Services Limited, Derby (GB)

( * ) Notice: Subject to any disclaimer, the term of this patent is extended or adjusted under 35 U.S.C. 154(b) by 1 day.

(21) Appl. No.: 13/738,427

(22) Filed: Jan. 10, 2013

(65) Prior Publication Data

US 2013/0181687 A1     Jul. 18, 2013

(30) Foreign Application Priority Data

Jan. 18, 2012  (GB) ................................. 1200803.3

(51) Int. Cl.
*H02P 9/02* (2006.01)
*H02P 25/22* (2006.01)

(52) U.S. Cl.
USPC ............... 322/44; 322/59; 318/803; 290/40 B

(58) Field of Classification Search
CPC ........ H02P 9/02; H02P 25/22; F02D 41/3082
USPC .............. 322/44, 20, 77, 59, 16, 14; 318/803, 318/105, 494; 363/71, 65
See application file for complete search history.

(56) References Cited

U.S. PATENT DOCUMENTS

| | | | |
|---|---|---|---|
| 4,654,572 A * | 3/1987 | Hirata | 318/722 |
| 5,708,576 A | 1/1998 | Jones et al. | |
| 5,937,829 A | 8/1999 | Endou | |
| 6,005,362 A * | 12/1999 | Enjeti et al. | 318/479 |
| 6,163,129 A * | 12/2000 | Younger et al. | 318/799 |
| 6,445,966 B1 * | 9/2002 | Younger et al. | 700/83 |
| 6,971,373 B2 | 12/2005 | Mudway et al. | |
| 7,583,063 B2 | 9/2009 | Dooley | |
| 7,928,592 B2 * | 4/2011 | Wagoner et al. | 290/44 |
| 7,944,068 B2 * | 5/2011 | Wagoner et al. | 290/44 |
| 8,115,444 B2 * | 2/2012 | De et al. | 318/801 |
| 8,209,107 B2 | 6/2012 | Rozman et al. | |
| 8,553,432 B2 * | 10/2013 | Komulainen et al. | 363/35 |
| 8,587,240 B2 * | 11/2013 | Wolfe et al. | 318/430 |
| 2007/0073445 A1 * | 3/2007 | Llorente Gonzalez et al. | 700/286 |
| 2007/0133235 A1 * | 6/2007 | Kurosawa | 363/50 |
| 2007/0236186 A1 * | 10/2007 | Patterson | 322/59 |
| 2008/0106100 A1 * | 5/2008 | Hyvarinen | 290/44 |
| 2008/0297088 A1 * | 12/2008 | Steimer | 318/494 |

(Continued)

FOREIGN PATENT DOCUMENTS

JP          03261399 A  * 11/1991  ................ H02P 9/00

OTHER PUBLICATIONS

Apr. 27, 2012 Search Report issued in British Application No. 1200803.3.

*Primary Examiner* — Julio C. Gonzalez
(74) *Attorney, Agent, or Firm* — Oliff PLC

(57) ABSTRACT

A fault tolerant electric drive system includes an alternator, a motor controller and an electric motor, wherein the alternator and motor each have a plurality of corresponding independent phase windings, the motor controller having a plurality of independent phase drives corresponding to the phase windings, and a plurality of independent electric drive phases is defined by connecting each corresponding phase winding of the alternator and motor to a corresponding phase drive of the motor controller.

13 Claims, 3 Drawing Sheets

(56) References Cited

U.S. PATENT DOCUMENTS

2009/0212568 A1* 8/2009 Maibach et al. ............... 290/44
2012/0217921 A1* 8/2012 Wu et al. ....................... 318/490
2013/0106256 A1* 5/2013 Mizukoshi et al. ......... 310/68 D

* cited by examiner

FAULT TOLERANT ELECTRIC DRIVE SYSTEM

This invention relates to a fault tolerant electric drive system. In particular, it relates to a fault tolerant electric drive system suitable for use in driving a fuel pump of an aircraft fuel pumping system.

A conventional fuel pumping arrangement for an aero-engine may use an engine gearbox driven fixed displacement main fuel pump to supply fuel to the engine via a suitable metering arrangement. The rate at which fuel is delivered from such a pump is related to the engine operating speed. The pump is designed to have a capacity such that the maximum or peak fuel demand can be achieved. As a result, during periods in which the fuel delivery requirement is relatively low, such as during cruise, a significant quantity of fuel pressurised by the pump is returned to the low pressure side thereof. Such pressurisation and re-circulation of fuel results in the temperature of the fuel rising, and this is undesirable.

Rather than use fixed displacement pumps, variable displacement pumps such as vane pumps are known. However these pumps are much more complex and require regular maintenance in order to provide reliable operation, and so their use is typically not preferred. An electrically driven fixed displacement fuel pump would be advantageous as its speed could be reduced when higher flows are not required thus reducing the amount of waste heat added to the fuel and improving pump life. An example of a known electrically driven fuel pumping arrangement is described in US 2009/0187326.

One of the problems with a conventional electric motor and drive system is that an electrical failure in the drive system may result in the motor no longer being driven. Clearly, if used in driving the fuel pump associated with an aircraft engine, such a failure would result in the fuel supply to the engine terminating unexpectedly. Fully redundant systems have been developed to ensure that the fuel supply can be maintained in the event of a failure. U.S. Pat. No. 6,971,373 describes one such arrangement. Due to the relatively low inertia of the pump and motor arrangement and the drag of the fuel, the drop in pump speed in the event of a failure is almost instantaneous resulting in a rapid fuel flow reduction and probable flameout of the engine. Even with a back-up electrical pump or a fully redundant system, the time delay in switching between redundant systems can result in a significant reduction in fuel flow when accommodating a fault.

U.S. Pat. No. 7,583,063 describes an arrangement in which additional, redundant, windings are provided in a motor or alternator, such that loss of a winding or an associated power drive component can be accommodated using the remaining windings and power circuits. Even though such an arrangement may permit accommodation of the failure of a motor winding, loss of electrical power can still be a problem. Whilst it is possible to add redundant power supplies, additional protection is required to isolate each motor phase drive to prevent short circuits from overloading the main supply (as described in U.S. Pat. No. 5,708,576). Consequently, the system weight and size rapidly increase because of the need to size the redundant supplies such that they are capable of driving all of the motor phases.

It is an object of the invention to provide a fault tolerant electric drive system that can be used with a main engine fuel pump, capable of accommodating any single electrical fault without a significant loss in engine performance, and so overcome or reduce the impact of the disadvantages outlined hereinbefore.

According to the present invention there is provided a fault tolerant electric drive system comprising an alternator, a motor controller and an electric motor, wherein the alternator and motor each have a plurality of corresponding independent phase windings, the motor controller having a plurality of independent phase drives corresponding to the phase windings, and a plurality of independent electric drive phases is defined by connecting each corresponding phase winding of the alternator and motor to a corresponding phase drive of the motor controller.

The motor preferably mechanically drives the main fuel pump of a gas turbine engine.

Conveniently, at least four electric drive phases are present.

Preferably, each motor controller phase drive comprises a phase controller and a 3D power bridge, the power bridge being adapted to receive a first AC current from the alternator phase winding, and to output a second AC current to the motor phase winding, the phase controller being arranged to control the power bridge output of the second AC current in response to a command input thereto. The command input to each phase controller may be from a common multiplexed serial bus, for example a common dual redundant multiplexed serial bus.

Preferably, the phase controller is powered by a DC voltage produced by the power bridge from the alternator input. The power bridge may comprise a voltage regulator arranged to supply the DC voltage to the phase controller.

Conveniently, each power bridge comprises an output current monitoring loop, which provides an input to the corresponding phase controller.

Each power bridge may comprise an AC-DC link and inverter

Preferably, each electric drive phase operates without the need for external electrical power supply, being powered only by the mechanical power input to the alternator.

The motor controller phase drives may be interconnected by a motor controller data-bus, enabling data to be shared between motor controller phase drives.

The motor controller phase drive may comprise a diode rectifier.

The motor controller phase drive may comprise a pulse width modulation inverter.

The invention will further be described, by way of example, with reference to the accompanying drawings, in which.

Figure 1:
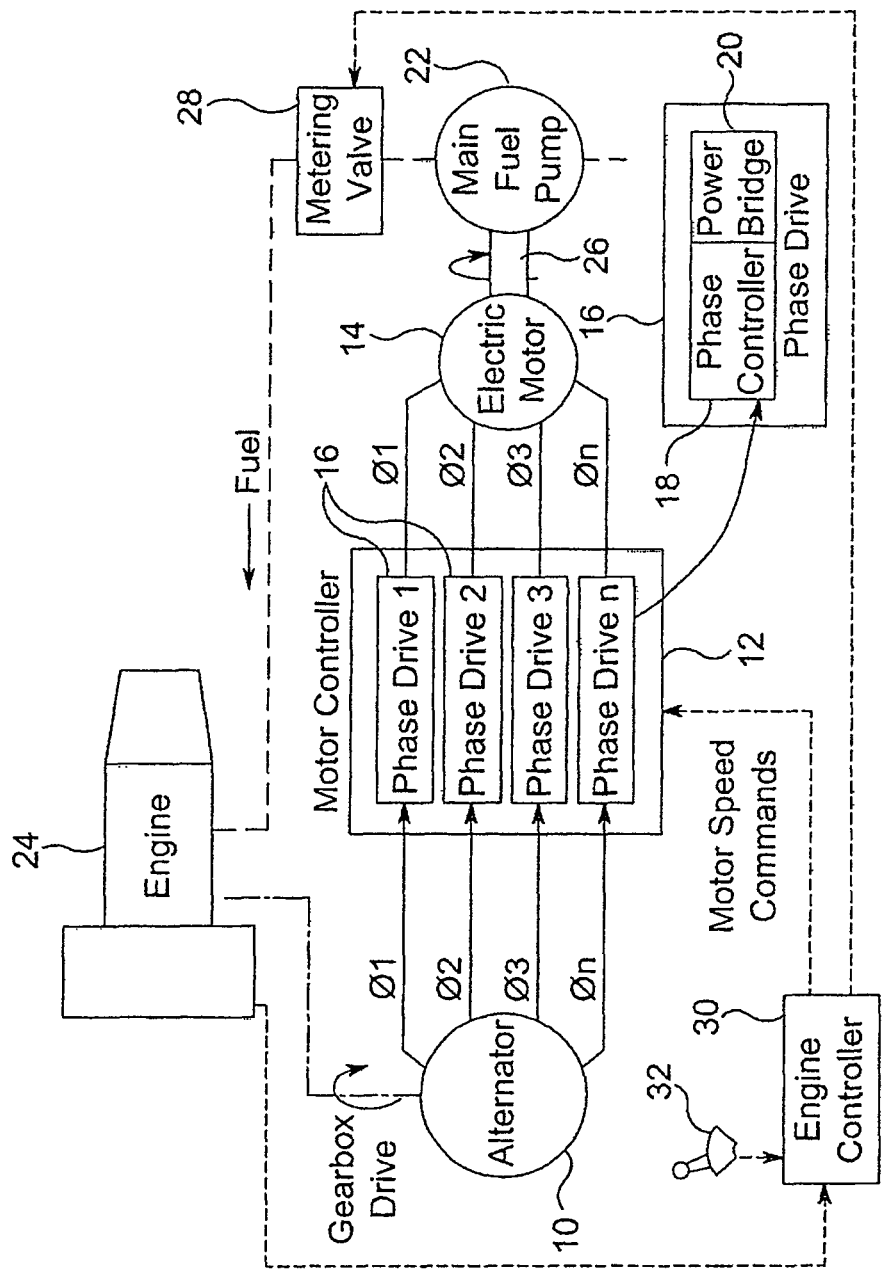
FIG. 1 is a schematic diagram of a fault tolerant electric drive system according to an embodiment of the invention.

The drive system shown in the accompanying drawings comprises an alternator 10 arranged to supply electrical power via a motor controller 12 to an electric motor 14. The alternator 10 is a multiphase alternator, having n phases, denoted by Ø1, Ø2, Ø3, . . . up to Øn respectively, and each phase Øn of the alternator 10 is electrically connected to a corresponding phase of the motor 14 via an independent phase drive 16 of the motor controller 12. Each phase drive 16 of the motor controller 12 comprises an AC/AC convertor arranged to convert the input AC waveform from the alternator phase to an arbitrary AC output waveform supplied to the motor phase. Independent electric drive phases are thereby defined comprising an alternator phase, and its corresponding motor controller phase drive 16 and an associated motor phase.

Each motor controller phase drive 16 comprises a phase controller 18 (see FIG. 2) and a power bridge 20 (see FIG. 3), the phase controller 18 controlling the current provided to its associated motor phase 14, via the power bridge 20, which rectifies and filters the current from the corresponding phase of the alternator 10.

A fault tolerant electric drive is thereby created which can continue to operate after the loss of any complete electric drive phase. The failure of any single alternator winding, phase drive or motor winding will result in the loss of just a single electric drive phase, the remaining phases being able to continue to operate independently of the failed phase. Depending on the desired level of fault tolerance, the electric drive may be provided with an arbitrary number of electric drive phases. Preferably, four electric drive phases are provided, and the electric drive is specified such that it may continue to function by providing sufficient torque/power/speed with the loss of a single complete electric drive phase. Whilst an arrangement with four phases is described, it will be appreciated that the invention is not restricted in this regard, and arrangements having greater, or fewer, phases are possible without departing from the scope of the invention.

Referring to FIG. 1, the fault tolerant electric drive system is illustrated driving the main fuel pump 22 of a gas turbine aero-engine 24. Such engines are obviously required to operate with a high degree of reliability, and the main fuel pump 22 thereof must be similarly reliable. The engine 24 drives the alternator 10 via a mechanical gearbox, at a speed which is proportional to the engine operating speed. The electric motor 14 is mechanically coupled to the main fuel pump 22 by a drive shaft 26. The main fuel pump 22 provides fuel to the engine 24 via a fuel metering valve 28. The nature and function of the metering valve 28 will be understood by one skilled in the art and so it will not be described herein in further detail. The electric drive system is controlled by motor speed commands that originate from an engine controller 30, which is in turn responsive to the pilot's controls 32. The engine controller 30 further receives information from a number of sensors (not shown) sensitive to a range of parameters associated with the engine 24, and also serves to control the operation of the metering valve 28.

Figure 2:
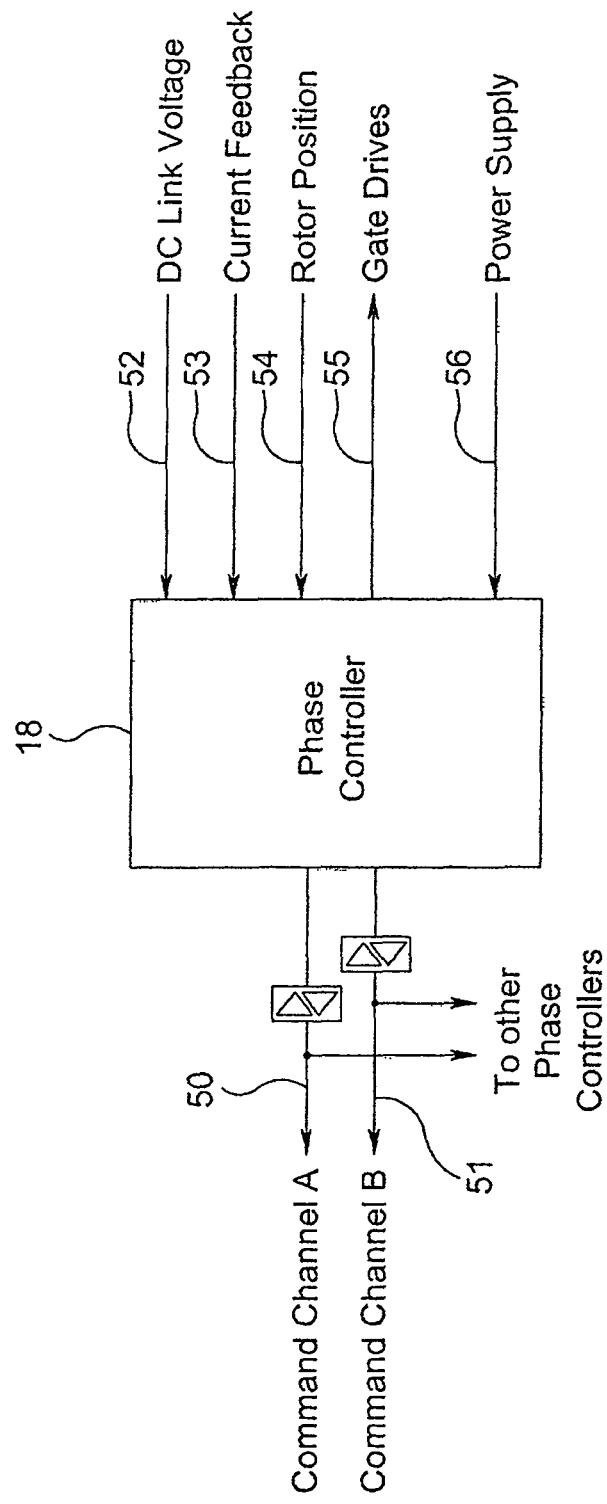
FIG. 2 is a schematic diagram of a bridge controller circuit forming part of the system of FIG. 1.

Referring to FIG. 2, each phase controller 18 of each motor control phase drive 16 may be controlled by commands from the engine controller 30 that are transmitted to the phase controller 18 via a multiplexed bus. In FIG. 2, a dual redundant multiplexed serial bus, with first and second command channels 50, 51 from the engine controller 30, is shown. Each of the command channels 50, 51 is further connected to the other phase controllers 18 of the electric drive system. The commands for the electric drive system are passed to all phase controllers 18 so that the correct sequencing of power phase current to the motor phases can be scheduled accordingly. Optionally, each of the phase controllers 18 may include a further data bus that enables data to be shared between the phase controllers 18, for instance for fault monitoring and accommodation purposes and/or for performance optimisation of the electrical drive scheme. Each phase controller 18, controls the current provided to its associated motor winding by gate drive signals 55, which are provided to the power bridge 20 of each motor control phase drive 16.

Each phase controller 18 receives, from the power bridge 20 of the same phase drive 18, a regulated power supply 56, DC link voltage input 52 and a current feedback input 53. A rotor position input 54 is provided to each phase controller 18 from a sensor on the rotor of the motor 14. The form and function of this sensor is well known to those skilled in the art. The phase controller 18 for each independent electric drive phase Ø1 to Øn schedules power using its associated power bridge drive circuit according to the current demand, rotor position and DC link voltage.

Figure 3:
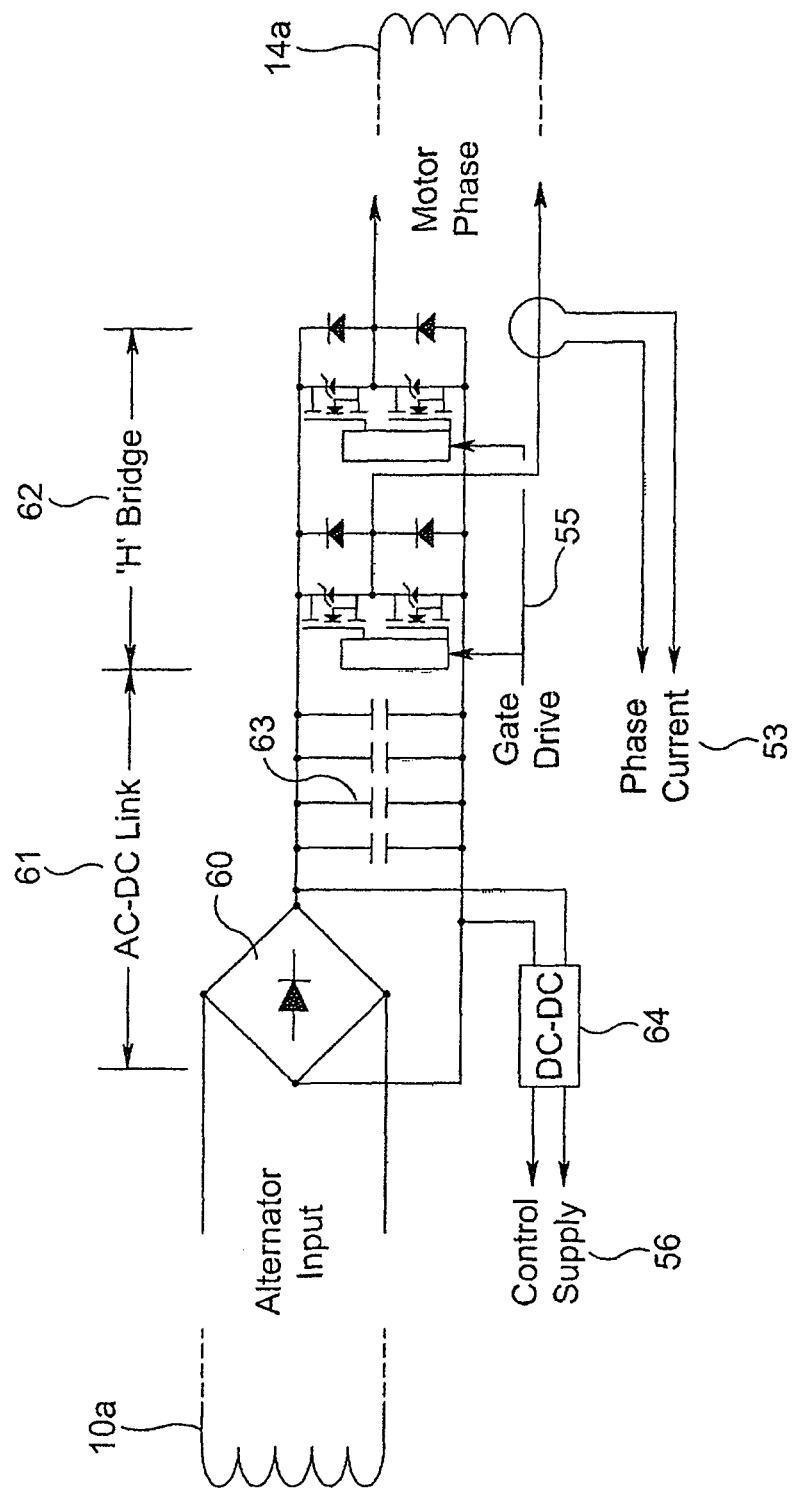
FIG. 3 is a schematic diagram of a power bridge drive forming another part of the system of FIG. 1.

Referring next to FIG. 3, the power bridge 20 of each phase drive 16 comprises an AC-DC link 61, and a bridge circuit 62. The AC-DC link 61 rectifies and filters the AC power received from an alternator winding 10a. The AC-DC link 61 comprises a diode bridge rectifier 60 and smoothing capacitors 63, the output from which is a substantially DC voltage which is unregulated, and approximately proportional to the rotational speed of the alternator 10. The output from the AC-DC link 61 feeds directly into the bridge circuit 62, which schedules power to a motor winding 14a that corresponds to the alternator winding 10a. The bridge circuit 62 is a pulse width modulation inverter with a standard H-bridge topology, and is controlled by gate drive signals 55 from the phase controller 18. The form and function of the AC-DC link 61 and bridge circuit 62 will be understood by those skilled in the art and so will not be described further.

The power bridge 20 includes a current monitoring loop which provides phase current feedback 53 to the phase controller 18. A further DC-DC convertor/regulator stage 64 may conveniently be included in the power bridge 20, to provide a regulated power supply 56 to the phase controller 18.

Each alternator winding 10a and its associated phase drive 16 and motor winding 14a is independent of other power sources, and therefore filtering and control of electrical power supply distortion is only necessary to meet the requirements of the associated phase drive bridge circuit 62.

Where the electric drive system drives the main fuel pump 22 of an aero-engine, as shown, the alternator speed and power rating is arranged such that the motor 14 will generate the required fuel flow to the engine 24 across the complete operating range of the engine and for all worst case operating conditions.

The embodiment of the invention described hereinbefore provides a fault tolerant electric drive system that is capable of continuing to operate after the loss of a single alternator winding using only four winding phases on both the motor and alternator. Known, prior art systems employing a conventional 3-phase motor with dual redundancy in the alternator would require an alternator with 6 winding phases (as disclosed in U.S. Pat. No. 7,583,063) to achieve this. The use of conventional motor and alternator arrangements also reduces the degree of isolation that can be achieved between motor phases and between alternator phases making it more difficult to isolate faulty windings and associated power drive circuits under fault conditions.

The arrangement disclosed herein can tolerate any single electrical fault, including any single fault in the phase controller 18 or phase bridge 20 of the phase drives 16. Furthermore, any faults that occur can be accommodated almost seamlessly, without a large and/or rapid dip in electric motor power drive to the main fuel pump 22 (and the concomitant risk of flameout in aero-engine applications). The independence between the phase windings result in full electrical isolation between phase windings, for example, allowing shorted windings to be disconnected without impairing electric motor drive performance. No externally sourced power and associated cables are required (for example from the aircraft), thus also removing any need for bulky EMI/filtering components. Furthermore, each of the AC-DC links and bridge circuits need only be rated to accommodate full phase power, rather than full motor power.

It will be appreciated that a wide range of modifications and alterations may be made to the arrangements described hereinbefore without departing from the scope of the invention as defined by the appended claims.

The invention claimed is:

1. A fault tolerant electric drive system comprising an alternator, a motor controller and an electric motor, wherein the alternator and motor each have a plurality of corresponding independent phase windings, the motor controller having a plurality of independent phase drives corresponding to the phase windings, and a plurality of independent electric drive phases is defined by connecting each corresponding phase winding of the alternator and motor to a corresponding phase drive of the motor controller, wherein each motor controller phase drive comprises a phase controller and a power bridge, the power bridge being adapted to receive a first AC current from the alternator phase winding, and to output a second AC current to the motor phase winding, the phase controller being arranged to control the power bridge output of the second AC current in response to a command input thereto.

2. The system according to claim 1, wherein the motor mechanically drives the main fuel pump of a gas turbine engine.

3. The system according to claim 1, and comprising at least four electric drive phases.

4. The system according to claim 1, wherein the command input to each phase controller is from a common multiplexed serial bus.

5. The system according to claim 4, wherein the command input to each phase controller is from a common dual redundant multiplexed serial bus.

6. The system according to claim 1, wherein the phase controller is powered by a DC voltage produced by the power bridge from the alternator input.

7. The system according to claim 6, wherein the power bridge comprises a voltage regulator arranged to supply the DC voltage to the phase controller.

8. The system according to claim 1, wherein each power bridge comprises an output current monitoring loop, which provides an input to the corresponding phase controller.

9. The system according to claim 1, wherein each power bridge comprises an AC-DC link and bridge circuit.

10. The system according to claim 9, wherein the AC-DC link comprises a diode rectifier.

11. The system according to claim 9, wherein the bridge circuit comprises a pulse width modulation inverter.

12. The system according to claim 1, wherein each electric drive phase operates without the need for external electrical power supply, being powered only by the mechanical power input to the alternator.

13. The system according to claim 1, wherein the motor controller phase drives are interconnected by a motor controller data-bus, enabling data to be shared between motor controller phase drives.

* * * * *